(12) United States Patent
Kudla et al.

(10) Patent No.: US 8,641,066 B2
(45) Date of Patent: Feb. 4, 2014

(54) INTEGRATED SUSPENSION AND DIFFERENTIAL MOUNTING STRUCTURE

(75) Inventors: Christopher Kudla, Delaware, OH (US); Naoki Munekata, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 13/051,563

(22) Filed: Mar. 18, 2011

(65) Prior Publication Data

US 2012/0235375 A1    Sep. 20, 2012

(51) Int. Cl.
    B62D 21/00    (2006.01)
(52) U.S. Cl.
    USPC ............... 280/124.109; 180/312; 280/781
(58) Field of Classification Search
    USPC ............... 280/124.109, 788, 781; 180/312
    See application file for complete search history.

(56) References Cited

U.S. PATENT DOCUMENTS

| | | | | |
|---|---|---|---|---|
| 4,723,791 A * | 2/1988 | Miura et al. | ........... | 280/124.109 |
| 5,244,053 A | 9/1993 | Kashiwagi | | |
| 5,385,369 A * | 1/1995 | Mukai et al. | ................ | 280/788 |
| 5,562,308 A * | 10/1996 | Kamei et al. | ................ | 280/788 |
| 6,623,020 B1 * | 9/2003 | Satou | .................... | 280/124.109 |
| 6,929,272 B2 * | 8/2005 | Matsumoto et al. | ... | 280/124.109 |
| 6,962,390 B1 * | 11/2005 | Myers et al. | ................. | 296/205 |
| 7,464,948 B2 | 12/2008 | Ramsey | | |
| 7,520,514 B2 * | 4/2009 | Ogawa et al. | ........... | 280/124.109 |
| 7,886,861 B2 * | 2/2011 | Nozaki et al. | ................. | 180/232 |
| 2004/0216556 A1 | 11/2004 | Smith et al. | | |
| 2004/0256829 A1 | 12/2004 | Chalin et al. | | |
| 2007/0024044 A1 * | 2/2007 | Ogawa et al. | ................. | 280/788 |
| 2010/0032542 A1 * | 2/2010 | Heitkamp et al. | ............ | 248/548 |

FOREIGN PATENT DOCUMENTS

| | | |
|---|---|---|
| JP | 10-250618 | 9/1998 |
| JP | 2001-063618 | 3/2001 |
| JP | 2002-347648 | 12/2002 |
| JP | 2004-360803 | 12/2004 |

OTHER PUBLICATIONS

Hiroyuki Yoshida, Elastic Supporting Device, Dec. 24, 2004, JPO, JP 2004-360803 A, Machine Translation of Description.*

* cited by examiner

Primary Examiner — James English
(74) Attorney, Agent, or Firm — Rankin, Hill & Clark LLP

(57) ABSTRACT

An integrated vehicular suspension and differential mounting structure includes a metal base frame which supports a differential support member having a body formed of a resin or composite material. The differential support member further includes integrated annular collars having a central portion formed of a metal and a peripheral portion formed of resin or rubber. The peripheral portion of the collars are integrated with the resin or composite body of the differential support member. The base frame may further include a bracket for supporting the differential support member and a bracket for mounting an associated suspension system. The bracket for supporting the differential support member may be integrally formed with the bracket for mounting the associated suspension system.

8 Claims, 3 Drawing Sheets

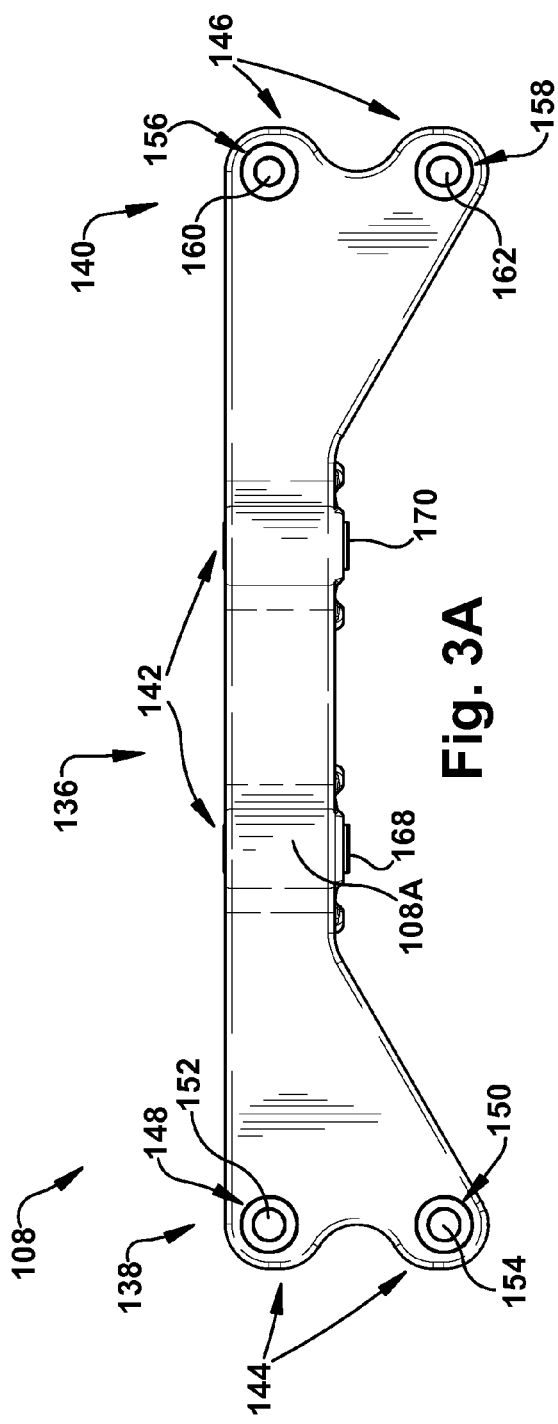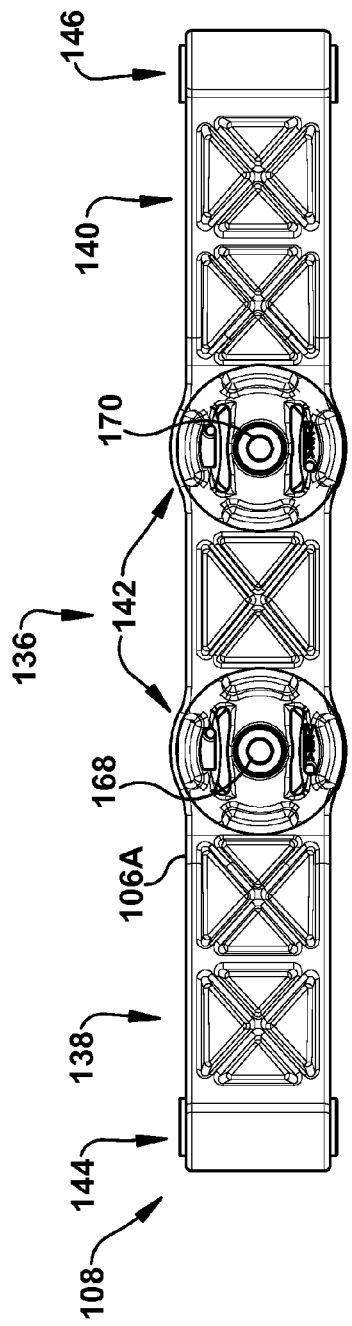

INTEGRATED SUSPENSION AND DIFFERENTIAL MOUNTING STRUCTURE

BACKGROUND

The present disclosure generally relates to an integrated vehicular suspension and differential mounting structure. More particularly, the present disclosure relates to an integrated suspension and differential mounting structure including a differential mounting member formed of a light weight composite material and secured to a base frame.

Motor vehicle frames which support vehicular components and provide structural integrity to the associated vehicle are generally known in the art. Among other functions, the vehicle frames may support suspension and differential transmission members or assemblies. These vehicle frames may include transverse outer portions provided to support the vehicle suspension assembly, as well as generally centrally disposed portions provided to support a vehicle differential transmission, such as a rear differential. To ensure sufficient structural strength, conventional frames are wholly formed of a metal, such as aluminum or steel. Moreover, the frames may be cast or otherwise formed as a singular integrated member. Alternatively, vehicle frames may be formed of separate metal or metal pieces which are welded together. The frames may also include one or more brackets secured to the metal or metal members of the frame which are provided to support the vehicle differential.

While conventional vehicle frames may effectively support the suspension assembly and differential, the conventional frames may be unnecessarily heavy, thereby reducing the fuel efficiency and driving performance of the associated vehicle. Furthermore, the crash performance of conventional frames, while generally considered adequate, may be improved upon. Further still, the brackets used to support the differential in conventional frames may not support or react to the loads from the suspension system or assembly.

SUMMARY

According to one aspect, a vehicle differential support member comprises a body formed of a composite material and a differential support element provided by the body and configured to secure an associated vehicle differential to the differential support member body. The body may have a central portion provided between transversely opposed end portions, and the differential support element may be provided by the body central portion. Further, the vehicle differential support member may further comprise base frame securing elements provided on the body end portions and configured to secure the body to an associated base frame.

According to another aspect, a vehicle frame assembly comprises a base frame and a differential support member. The base frame is formed of metal and has a pair of lateral members transversely spaced from one another. The differential support member is secured to the base frame and includes a body and a differential support element. The body is formed of a composite material and is secured at each end to one of the base frame lateral members. The differential support element is configured to secure an associated vehicle differential to the differential support member body.

According to yet another aspect, a vehicle suspension and differential mounting assembly comprises a base frame, a vehicle differential, a differential support member, and suspension mounting members. The base frame is formed of metal, has a pair of lateral members transversely spaced from one another, and each of the lateral members have a bracket provided thereon. The differential support member is secured to the base frame, has a body formed of a composite material secured at each end to one of the base frame lateral member brackets, and has a differential support element securing the vehicle differential to the differential support member body. The suspension system mounting members are integrated with the brackets provided on the lateral members.

BRIEF DESCRIPTION OF THE DRAWINGS

FIG. 3A is a front view showing the differential mounting member

FIG. 3B is a plan view showing the differential mounting member.

DETAILED DESCRIPTION

Figure 1:
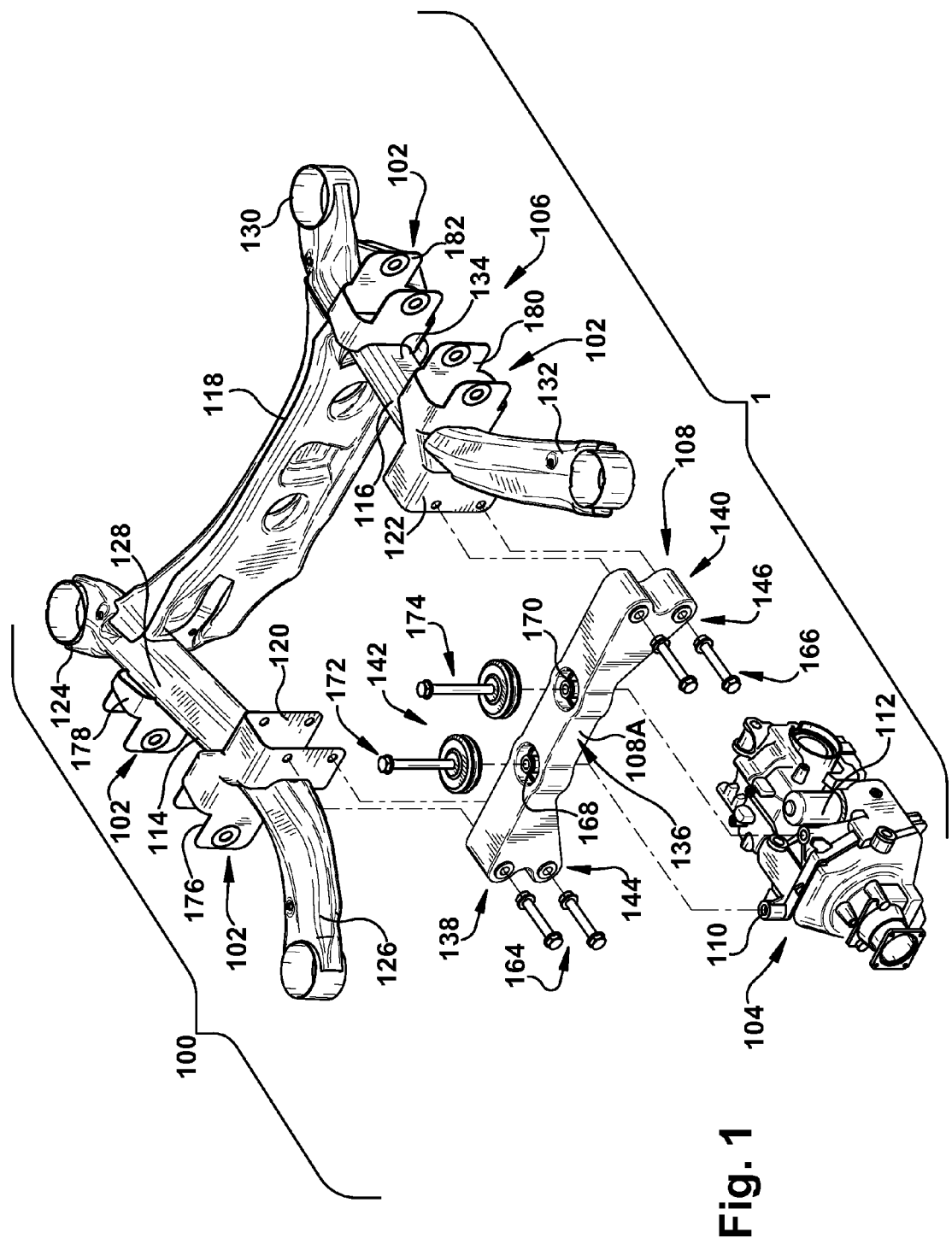
FIG. 1 is an exploded perspective view illustrating a vehicle sub-assembly including a suspension and differential mounting assembly.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. More particularly, references to a "lateral" direction indicate a forward-rearward direction of an associated vehicle, references to a "transverse" direction indicate a left-right or side-to-side direction of the associated vehicle, and references to a "vertical" direction refer to an up-down direction of the associated vehicle. Like numbers refer to like parts throughout the several views.

With reference to FIG. 1, a vehicle sub-assembly 1 includes a suspension and differential mounting or frame assembly 100 (hereinafter, "mounting assembly 100"), a suspension system (not shown) supported by suspension mounting members 102 of the mounting assembly 100, and a vehicle differential 104 supported by a differential support member 108 of the mounting assembly 100. The mounting assembly 100 includes a base frame 106 supporting the suspension mounting members 102 and the differential support member 108. The suspension mounting members 102 are configured to engage, either directly or indirectly, the vehicle suspension system, and the differential support member 108 is configured to support the differential 104. The sub-assembly 1 is provided in an associated vehicle (not shown) in a known manner to facilitate operational engagement of the suspension mounting members 102 with the vehicle suspension system and the differential 104 to corresponding vehicle components (not shown), such as vehicle wheels (not shown).

As described herein, the exemplary vehicle sub-assembly 1 is provided at a rear portion of a vehicle such that the suspension mounting members 102 can engage a rear suspension system (not shown) and the differential 104 is a rear differential. The description of the sub-assembly 1 as a vehicle rear sub-assembly is considered to be exemplary, and is not intended to limit the disclosed sub-assembly 1 to such a use. In this regard, it is noted that the sub-assembly 1 and/or the mounting assembly 100 may be provided in a front or any other portion of the associated vehicle.

With initial reference to the associated vehicle suspension system which engages and is supported by the suspension mounting members 102, it is noted that suspension systems are generally known to include a system of springs, shock absorbers, and/or linkages that connect the vehicle to its wheels. In this case, the suspension system connects the mounting assembly 100 to the vehicle wheels. The precise configuration of the suspension system may vary depending on design constraints and other considerations related to the associated vehicle. The suspension mounting members 102 described herein, as well as the supporting base frame 106, are considered to be amenable for use with any suspension system. As the disclosure is principally directed to the sub-assembly 1 on which the suspension system is mounted, and suspension systems are considered to be generally well-known in the art, the suspension system is not described in detail herein.

With respect to the differential 104, it is noted that differentials are generally known in the art as transmission devices which transmit torque and rotation from a drive shaft to vehicle wheels. The exemplary differential 104 described herein is a rear differential for transmitting torque and rotation from a drive shaft (not shown) to two vehicle rear wheels (not shown). It is to be appreciated that the herein described sub-assembly 1 is readily amenable for use with a front or other variety of differential. As differentials are well known in the art, structural features of the differential 104 related to the operation thereof will not be described in detail herein. Rather, the differential 104 will only be described with respect to its engagement with, and support by, the differential support member 108 and the mounting assembly 100. In this regard, as shown in FIG. 1, the differential 104 includes a first engagement opening 110 and a second engagement opening 112, both of which are formed through an upper surface of the differential 104. As is described in further detail below, the first and second engagement openings 110, 112 facilitate the engagement of the differential 104 to the differential support member 108, such as by suitable fasteners.

Figure 2:
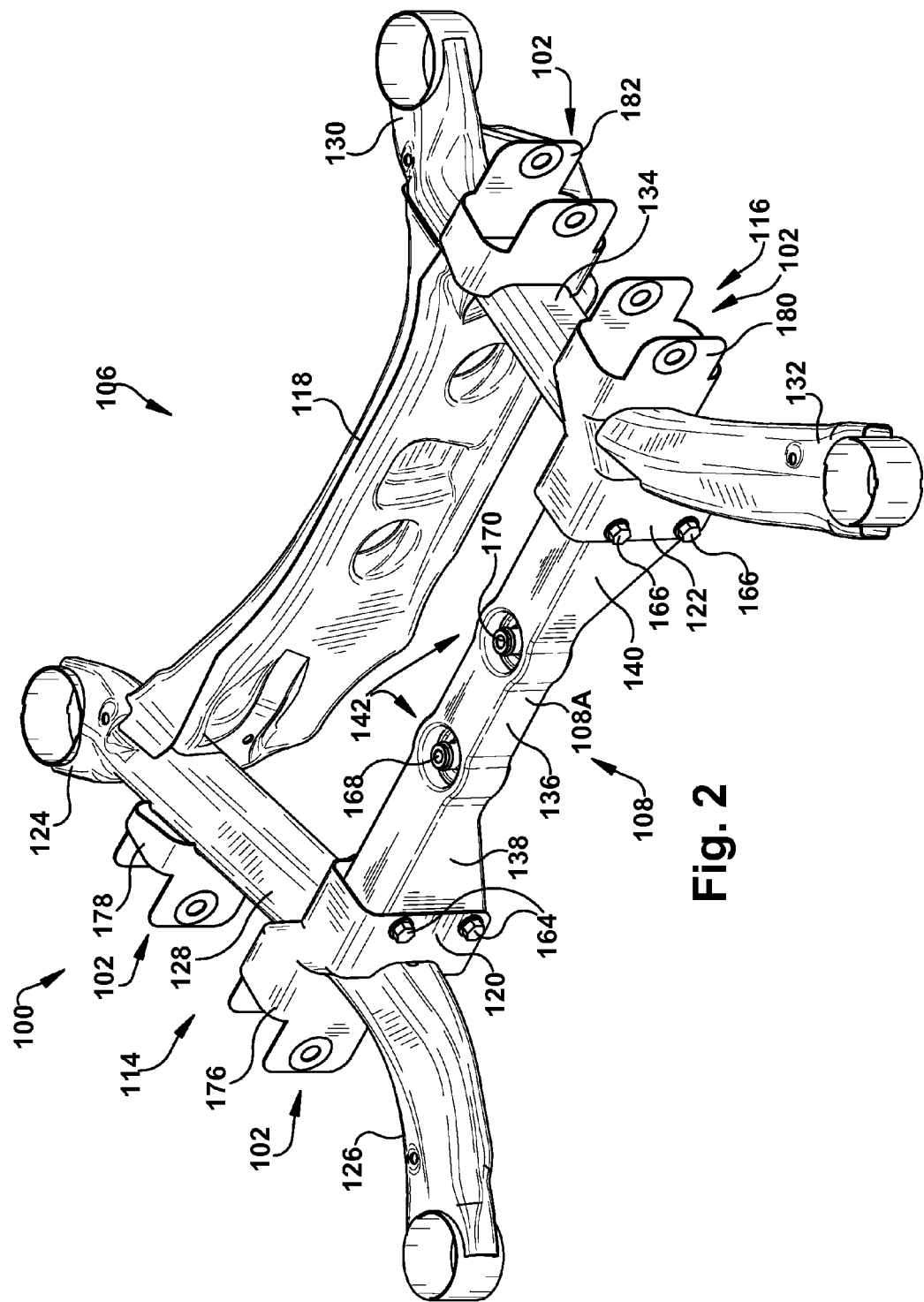
FIG. 2 is a perspective view illustrating the vehicle suspension and differential mounting assembly base frame and differential mounting member.

The base frame 106 of the mounting assembly 100, as illustrated in FIGS. 1 and 2, includes a first lateral member 114, a second lateral member 116, and a rear cross member 118. The first and second lateral members 114, 116 can be beam-type members which extend in a substantially lateral direction of the vehicle, and the rear cross member 118 can be a beam-type member which extends in a transverse direction of the vehicle. In the illustrated embodiment, the first and second lateral members 114, 116 are transversely spaced from one another and are connected at rear portions thereof by the rear cross member 118. As is explained in further detail below, front portions of the first and second lateral members 114, 116 are connected to one another by the differential support member 108, which is supported on the first lateral member 114 by a first bracket 120 and on the second lateral member 116 by a second bracket 122. Furthermore, the base frame 106 also supports the suspension mounting members 102.

The base frame 106 may be formed of a metal, such as aluminum or steel. It is noted that hereinafter, metal and/or steel materials will be denoted as "metal". Further, the first lateral member 114, the rear cross member 118, and the second lateral member 116 may be integrally formed or cast as a single piece. Alternatively, the rear cross member 118 may be joined at one transverse end to the first lateral member 114 and at an opposite transverse end to the second lateral member 116 via any known joining mechanism or method. For example, the rear cross member 118 may be joined to the first and second lateral members 114, 116 via welding, mechanical fasteners, or any other known method or mechanism. Similarly, the first and second brackets 120, 122, as well as the suspension mounting members 102, may be integrally formed with the first and second lateral members 114, 116, respectively, or may be secured thereto by welding or through the use of mechanical fasteners.

Though the first and second lateral members 114, 116 are described as extending in a lateral direction of the vehicle, the members may not necessarily linearly extend in the lateral direction. As illustrated, the first lateral member 114 may include a rear portion 124, a front portion 126, and a central portion 128 disposed between the rear and front portions 124, 126. As used herein, the rear portion 124 is the portion of the first lateral member 114 disposed in a rearward direction relative to the rear cross member 118, the front portion 126 is the portion of the first lateral member 114 disposed in a forward direction relative to the first bracket 120, and the central portion 128 is disposed between the rear cross member 118 and the first bracket 120. As shown in FIGS. 1 and 2, the rear and front portions 124, 126 may extend slightly outwardly in a transverse direction from the central portion 128 such that the first lateral member 114 has a concave shape relative to a transverse outer side of the associated vehicle.

The second lateral member 116 also includes a rear portion 130, a front portion 132, and a central portion 134 disposed between the rear and front portions 130, 132. As used herein, the rear portion 130 of the second lateral member 116 is the portion of the second lateral member 116 disposed in a rearward direction relative to the rear cross member 118, the front portion 132 of the second lateral member 116 is the portion of the second lateral member 116 disposed in a forward direction relative to the second bracket 122, and the central portion 134 of the second lateral member 116 is disposed between the rear cross member 118 and the second bracket 122. The second lateral member 116 is symmetrically formed with respect to the first lateral member 114, with the rear and front portions 130, 132 of the second lateral member 116 extending slightly outwardly in a transverse direction from the central portion 134 to form a concave shape relative to a transverse outer side of the associated vehicle adjacent to the second lateral member 116.

The rear cross member 118 extends in a substantially transverse direction so as to connect the first and second lateral members 114, 116 at laterally aligned positions. Similarly, the first and second brackets 120, 122 are also laterally aligned with one another such that the differential support member 108 extends in a transverse direction and is substantially parallel to the rear cross member 118. As is apparent with reference to FIG. 2, the central portions 128, 134 of the first and second lateral members 114, 116 cooperate with the rear cross member 118 and the differential support member 108 to form a generally rectangular or trapezoidal shape when viewed from above.

With respect to the first and second brackets 120, 122, each is associated with a respective lateral member 114, 116 so as to be generally laterally aligned with the opposite bracket 120, 122 and to project from the associated lateral member 114, 116 toward the other bracket 120, 122 and lateral member 114, 116. Generally, the first and second brackets 120, 122 are configured to support the differential support member 108 by engaging each of opposed transverse ends of the differential support member 108. In this regard, the first and second brackets 120, 122 may take any shape or form which allows for the differential support member 108 to be supported thereby. As described herein, the first and second brackets 120, 122 are identically and symmetrically formed, though it is to be appreciated that the brackets 120, 122 need not be identical or symmetrical with one another.

As shown in FIGS. 1 and 2, the first and second brackets 120, 122 are substantially U-shaped members in the illustrated embodiment which project from inward-facing surfaces of the respective first and second lateral members 114, 116. The first bracket 120 has a generally horizontal upper surface connecting front and rear vertically oriented surfaces which are spaced from one another in the lateral direction. The upper, front, and rear surfaces generally orthogonally extend from an inward facing portion or surface of the first lateral member 114 toward the second bracket 122 and the second lateral member 116. The upper, front, and rear surfaces of the first bracket 120 define a generally rectangular cross-sectional enclosure having an opened bottom end and an area greater than that of an end of the differential support member 108 such that the end of the differential support member 108 can be received within the first bracket 120. The front and rear surfaces of the first bracket 120 also have aligned upper and lower openings defined therethrough. The upper and lower openings are sized to receive a mechanical fastener, such as a bolt, which can also be threaded through an opening formed through the differential support member 108 in a lateral direction to secure the differential support member 108 to the first bracket 120, as will be described in further detail below.

The second bracket 122 is substantially identical to the first bracket 120. As such, the above description of the first bracket 120 is considered relative to the second bracket 122. Particularly, the structure and positioning of the second bracket 122 is identical to that of the first bracket 120, with the only differences being associated with the second bracket 122 being integrated with or secured to the second lateral member 116, rather than the first lateral member 114. In this regard, the second bracket 122 extends from the second lateral member 116 toward the first bracket 120 and the first lateral member 114.

The differential support member 108 is a beam-type member having a body 108A formed of a composite or resin material. As used herein, the term "composite material" is intended to reference a plastic, polymer, resin, or rubber material. Exemplary composite or resin materials from which the differential support member body 108A may be formed include thermoplastic or thermoset composites reinforced by fibers of glass, carbon, or steel. Aluminum or magnesium may also be used. It is to be appreciated that references herein to a composite or resin material implies a polymer or polymer-blend of some variety, with the foregoing list being an exemplary and non-exhaustive listing of suitable materials from which the differential support member body 108A may be formed.

The differential support member body 108A includes a central portion 136 disposed between a first end portion 138 and a second end portion 140 transversely opposed to the first end portion 138. The central portion 136 of the differential support member body 108A supports a differential support element 142 to which the differential 104 is secured. The first end portion 138 of the differential support member body 108A supports a first base frame securing element 144, and the second end portion 140 of the differential supporting member body 108A supports a second base frame securing element 146. The first base frame securing element 144 is configured to secure the first end portion 138 of the differential support member body 108A to the first bracket 120, and the second base frame securing element 146 is configured to secure the second end portion 140 of the differential support member body 108A to the second bracket 122.

As shown in FIGS. 3A and 3B, the differential support member 108 is generally symmetrically formed with respect to the first and second end portions 138, 140 of the differential support member body 108A. Further, the central portion 136 of the differential support member body 108A has a height dimension which is less than a height dimension of the first and second end portions 138, 140. More particularly, the central portion 136 has a generally rectangular cross-sectional shape when viewed from a front, such that upper and lower surfaces of the central portion 136 are substantially parallel with one another. Each of the first and second end portions 138, 140 include a downwardly tapered lower surface and a substantially linear upper surface which is aligned with the upper surface of the central portion 136. The tapered lower surface of the first and second end portions 138, 140 provides the first and second end portions 138, 140 with a height dimension greater than that of the central portion 136.

With further respect to the height dimensions of the first and second end portions 138, 140 of the differential support member body 108A, it is noted that the height dimension of each of the end portions 138, 140 increases toward a transverse outer end. As such, the first and second end portions 138, 140 have a maximum height at their respective outer ends. The increased height dimension allows a larger portion of the differential support member body 108A to be directly secured to the first and second brackets 120, 122, thereby increasing the strength of engagement between the differential support member 108 and the base frame 106.

With respect to the first and second base frame securing elements 144, 146, it is again noted that each is provided by or within the first and second end portions 138, 140 of the differential support member body 108A. More particularly, each of the first and second base frame securing elements 144, 146 is provided within a transverse outer portion of the respective first and second end portions 138, 140 of the differential supporting member body 108A. The first and second base frame securing elements 144, 146, as illustrated, allow for engagement of the differential supporting member body 108A with the base frame brackets 120, 122 using a nut and bolt assembly, as described in further detail below.

The first base frame securing element 144 provided in the first end portion 138 of the differential support member body 108A includes an upper collar 152 provided in an upper engagement opening 148 defined through an upper part of the first end portion 138 of the differential support member body 108A, and a lower collar 154 provided in a lower engagement opening 150 defined through a lower part of the first end portion 138 of the differential support member body 108A. The upper and lower collars 152, 154 provided in the first end portion 138 of the differential support member body 108A are configured to engage the first bracket 120 through a first fastening assembly 164.

Similarly, the second base frame securing element 146 provided in the second end portion 140 of the differential support member body 108A includes an upper collar 160 provided in an upper engagement opening 156 defined through an upper part of the second end portion 140, and a lower collar 162 provided in a lower engagement opening 158 defined through a lower part of the second end portion 140 of the differential support member 108. The upper and lower collars 160, 162 of the second end portion 140 of the differential support member body 108A are configured to engage the second bracket 122 through a second fastening assembly 166.

Each of the engagement openings 148, 150, 156, 158 are defined through the respective end portion 138, 140 of the differential support member body 108A in a lateral direction so as to communicate between a front and rear surface of the differential support member body 108A. As illustrated, the engagement openings 148, 150, 156, 158 are formed to have a generally circular shape, though it is to be appreciated that the engagement openings 148, 150, 156, 158 may have any other shape.

Each of the collars 152, 154, 160, 162 is a generally annular member having an outer circumference sized and shaped to fit within the respective engagement opening 148, 150, 156, 158. As indicated above, each collar 152, 154, 160, 162 is received within an associated engagement opening 148, 150, 156, 158 and thereby secured to the differential support member body 108A. Further, each of the collars 152, 154, 160, 162 may be formed of a metal, such as aluminum, and defines a central opening through which the respective first or second fastening assembly 164, 166 engages the differential support member body 108A and secures the differential support member 108 to the base frame 106, as described in further detail below.

As noted above, the differential support member body 108A is formed of a composite or resin material. Composite or resin material based products may be formed according to any of several forming methods, such as injection molding. The engagement openings 148, 150, 156, 158 may be defined after the formation of the differential support member body 108A, using a boring or drilling method. Alternatively, the engagement openings 148, 150, 156, 158 may be formed by providing a pattern in an injection mold in which the differential support member body 108A is formed. As a further alternative, the differential support member 108 may be formed with the collars 152, 154, 160, 162 disposed in the injection mold, such that the differential support member body 108A is formed with the collars 152, 154, 160, 162 integrally received therein. Regardless of the particular differential support member body 108A formation, the collars 152, 154, 160, 162 are configured to be integrated and/or secured to the differential support member body 108A so as to facilitate secure engagement of the differential support member body 108A to the first and second brackets 120, 122.

As shown in FIG. 1, the first and second fastening assemblies 164, 166 each include a pair of nut and bolt assemblies. Each bolt associated with the first fastening assembly 162 is configured to pass through one pair of aligned openings formed in the front and rear surfaces of the first bracket 120, as well as one of the openings defined by the upper and lower collars 152, 154 provided in the first end portion 138 of the differential support member body 108A. Similarly, each bolt associated with the second fastening assembly 166 includes a pair of nut and bolt assemblies, with each bolt configured to pass through one pair of aligned openings formed in the front and rear surfaces of the second bracket 122, as well as one of the openings defined by the upper and lower collars 156, 158 provided in the second end portion 140 of the differential support member body 108A.

As shown in FIGS. 1 and 2, the differential support member 108 is secured to and supported by the base frame 106 through the engagement of the first bracket 120 with the first base frame securing element 144 and the second bracket 122 with the second base frame securing element 146. Particularly, the differential support member body 108A is positioned such that at least a transverse outer portion of the first end portion 138 of the differential support member body 108A is received within the first bracket 120 and at least a transverse outer portion of the second end portion 140 of the differential support member body 108A is received within the second bracket 122. The bolt members of the first and second fastening assemblies 164, 166 are then threaded through the openings formed in the front surface of the first and second bracket members 120, 122, the upper and lower collars 152, 154, 160, 162 provided in the first and second end portions 138, 140 of the differential support member body 108A, and the openings formed in the rear surface of the first and second bracket members 120, 122.

Once the bolts of the first and second fastening assemblies are so threaded, nuts are threadedly engaged with ends of the bolts and tightened so as to secure the differential support member 108 to the first and second lateral members 114, 116 of the base frame 106 through the first and second brackets 120, 122. FIG. 2 illustrates the differential support member 108 secured to and supported by the base frame 106 through the above-described engagement. It is to be appreciated that the description of the first and second fastening assemblies 164, 166 as including nut and bolt assemblies is merely exemplary. The first and second fastening assemblies 164, 166 may include any other manner of securing mechanisms configured to secure one end of the differential support member 108 to the base frame 106. Moreover, the first and second base frame securing elements 144, 146 and the first and second brackets 120, 122 may also be altered to accommodate alternative fastening assemblies or securing mechanisms.

The differential support element 142 of the differential support member 108 is provided by the central portion 136 of the differential support member body 108A and may include a first differential support collar 168 and a second differential support collar 170. The first and second differential support collars 168, 170 are both generally annular members having a central opening and provided within the central portion 136 of the differential support member body 108A so as to pass through the central portion 136 in a vertical direction. The first and second differential support collars 168, 170 each include a central metal portion surrounded by a peripheral composite mount formed of a composite or resin material, such as a rubber. The composite mount is configured to surround at least a portion of a peripheral surface of the central metal portion of the first and second differential support collars 168, 170. The peripheral composite mounts may be integrated with the differential support member body 108A. More particularly, the differential support member body 108A may be formed with the first and second differential support collars 168, 170 such that the composite mounts of the first and second differential support collars 168, 170 are joined to and integrated with the differential support member 108.

The differential support element 142 may also include a first fastening assembly 172 configured to secure the differential 104 to the first differential support collar 168, and a second fastening assembly 174 configured to secure the differential 104 to the second differential support collar 170. The first and second fastening assemblies 172, 174, as illustrated in FIG. 1, can each include a bolt member and a washer or stopper member. The bolt member of each of the first and second fastening assemblies 172, 174 is configured to pass through the opening defined through the respective first and second differential support collar 168, 170 and to engage the differential 104 by being received within and threadedly engaged with the respective first and second engagement opening 110, 112 formed in the upper surface of the differential 104. The washers of the first and second fastening assemblies 172, 174 are configured to engage the upper surface of the central portion 136 of the differential support member body 108A.

The differential 104 is secured to and supported by the differential support member 108 by passing the bolt of the first fastening assembly 172 through the opening defined through the first collar 168 and the bolt of the second fastening assembly 174 through the opening defined through the second collar 170. Ends of the bolts disposed on a lower side of the differential support member body 108A are received in and threadedly engaged with the first and second engagement openings 110, 112 formed in the upper surface of the differential 104. The bolts of the first and second fastening assemblies 172, 174 are then tightened within the first and second engagement openings 110, 112 of the differential 104 so as to move the differential in an upward direction toward the lower surface of the central portion 136 of the differential support member body 108A. The washer or stopper members are compressed once the upper surface of the differential 104 is adjacent and/or close to the lower surface of the central portion 136 of the differential support member body 108A. As such, the differential 104 is secured to and supported by the differential support member 108 so as to be disposed below the differential support member 108. More particularly, the differential 104 is supported so as to be positioned below and adjacent to the central portion 136 of the differential support member body 108A.

With respect to the above-described mounting assembly 100, it is noted that the use of a composite or resin differential support member 108 yields a weight reduction. For example, when compared with a similar mounting assembly using a metal differential support or front cross member, the herein-described mounting assembly 100 may net a weight reduction of approximately 2.5 kg. Furthermore, the use of a front cross member or differential support member 108 formed of a composite material may also improve the crash performance of the mounting assembly 100 as compared with a metal front cross member. Particularly, the composite or resin differential support member 108 may have a specified breaking strength and failure location.

Moreover, it is noted that conventional mounting assemblies, wherein the differential is supported by brackets mounted to a metal front cross member, can only react to loading from the differential through the mounting brackets. In contrast, the herein described mounting assembly 100 and differential support member 108 reacts to both the suspension and differential loads through the differential support element 142, while also isolating drivetrain vibration. The load reaction features are provided, at least in part, by the first and second differential support collars 168, 170 having the composite mounts thereof integrated with the differential support member 108.

Additionally, the reaction of suspension loads by the differential support member 108 and the differential support element 142 thereof is facilitated by the indirect mounting of the suspension system to the brackets 120, 122 and the lateral members 114, 116 of the base frame 106. Particularly, the suspension mounting members 102 are formed such that load inputs from the suspension are transmitted to the composite differential support member body 108A. In this regard, the suspension mounting members 102 include a first suspension mounting bracket 176 integrated with the first bracket 120, a first suspension mounting hinge support 178 provided on the first lateral member 114 of the base frame 106, a second suspension mounting bracket 180 integrated with the second bracket 122, and a second suspension mounting hinge support 182 provided on the second lateral member 116 of the base frame 106.

The first suspension mounting bracket 176, as noted above, is integrally formed with the first bracket 120 with a connecting member extending across the first lateral member 114 in an outward transverse direction between the suspension mounting bracket 176 and the first bracket 120. An outward transverse end of the first suspension mounting bracket 176 provides a front hinge assembly configured to engage the suspension system and to allow vertical (up and down) movement of the suspension system relative to the mounting assembly 100. More specifically, the upper, front, and rear surfaces of the first bracket 120 extend in the outward transverse direction across the first lateral member 114 to form the first suspension mounting bracket 176. The front and rear surfaces receive a hinge member (e.g., a bolt), through which the suspension system may be secured to the first suspension mounting bracket 176, and thereby mounted to the base frame 106. The first suspension mounting hinge support 178 is secured to an outer part of the central portion 128 of the first lateral member 114, and extends in an outward transverse direction. The first suspension mounting hinge support 178 includes a pair of arms which support a hinge assembly configured to engage the suspension system and to allow vertical movement of the suspension system relative to the mounting assembly 100. An exemplary suspension system may include an A-shaped arm having a leg which engages the first suspension mounting bracket 176 and a leg which engages the first suspension mounting hinge 178.

It is noted that the suspension mounting members 102 on the first lateral member 114 are symmetrical and substantially identical to those formed on the second lateral member 116. As such, the above description of the suspension mounting members 102 formed on the first lateral member 114 is considered to apply to the suspension mounting members 102 formed on the second lateral member 116. Accordingly, it is to be understood that the suspension mounting members 102 provided by the second lateral member 116, e.g., the second suspension mounting bracket 180 and the second suspension mounting hinge 182, are identical to those provided by the first lateral member 114 but for their provision on the second lateral member 116 and extension therefrom in an opposite direction.

It is further noted that the engagement of the suspension system with the first suspension mounting bracket 176, the first suspension mounting hinge 178, the second suspension mounting bracket 180, and the second suspension mounting hinge 182 may be made in any manner. Moreover, the base frame 106 may include additional points of attachment or engagement with the suspension system, and the expressly disclosed points of attachment or engagement may be altered in various while remaining within the scope of the present disclosure. For example, rather than a single-axis hinge assembly, the suspension mounting members 102 may support a ball joint or other connecting member.

As noted above, the differential support member 108 and the differential support element 142 are configured to react loads from the suspension system. This load reaction is facilitated through integration of the brackets 120, 122 on which the differential support member 108 is mounted and the respective first and second suspension mounting brackets 176, 180. More particularly, loads applied to the first and second suspension mounting brackets 176, 180 from the suspension system are communicated to the differential support member 108 through the respective first and second brackets 120, 122 integrated with the first and second suspension mounting brackets 176, 180. As the differential support member 108 has a body 108A formed of a composite material, and is integrated with peripheral composite mounts of the differential support element 142, the differential support member 108 and the differential support element 142 thereof react loads from the suspension system.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

Among other modifications, it is noted that the base frame 106 may have a different shape or structure, or may be formed of a material other than metal. Further, the differential support member 108 may also have a different shape or structure, or may engage or attach to the base frame 106 in a manner different from that which is described above. Additionally, the differential support member 108 may support the differential 104 using alternative means. For example, the differential support member 108 may define a cradle shape so as to carry the differential 104 from below and/or from the sides thereof. Further still, the differential support member 108 and the base frame 106 may be modified to engage one another in a manner different from that described above. Additionally, insofar as suspension structures are described herein, it is noted that other types and varieties of suspensions may be used with the mounting assembly 100.

What is claimed is:

1. A vehicle frame assembly, comprising:
   a base frame formed of metal and having a pair of lateral members transversely spaced from one another;
   a differential support member secured to the base frame, the differential support member having a body formed of a composite material and secured at each end to one of the base frame lateral members, and a differential support element configured to secure an associated vehicle differential to the differential support member body, wherein the differential support member body has a central portion provided between transversely opposed end portions, the differential support element is provided by the body central portion, and the differential support member further comprises base frame securing elements provided by the body end portions, the base frame securing elements configured to secure each body end portion to one of the base frame lateral members;
   a pair of brackets each provided on a transverse inner portion of one of the lateral members which faces the other lateral member, each bracket configured to engage one of the base frame securing elements provided by the body end portions, wherein the bracket provided on one lateral member is aligned in a lateral direction with the bracket provided on the other lateral member;
   a pair of suspension system mounting members which are each integrally formed with one of the pair of brackets and provided on a transverse outer portion of one of the lateral members, each suspension system mounting member being laterally aligned with the bracket with which it is integrally formed; and
   a pair of connecting members, each of which extends transversely across one of the lateral members and connects one of the brackets to one of the suspension system mounting members.

2. The vehicle frame assembly according to claim 1, wherein the at least one cross member includes a rear cross member connecting the pair of lateral members at a position laterally spaced in a rearward direction from the differential support member.

3. The vehicle frame assembly according to claim 1, wherein the base frame securing elements comprise at least one metal collar provided through each body end portion, the at least one collar on each body end portion extending through the body in a lateral direction.

4. The vehicle frame assembly according to claim 1, wherein each of the brackets define a U-shape and extend from the corresponding lateral member toward the other lateral member, each U-shaped bracket being configured to engage front and rear lateral surfaces of the differential support member body.

5. The vehicle frame assembly according to claim 1, wherein the composite material is selected from a group consisting of: thermoplastic composites reinforced by glass fibers, thermoplastic composites reinforced by carbon fibers, thermoplastic composites reinforced by steel fibers, thermoset composites reinforced by glass fibers, thermoset composites reinforced by carbon fibers, and thermoset composites reinforced by steel fibers.

6. The vehicle frame assembly according to claim 1, wherein the differential support element comprises at least one annular collar which extends through the body in a vertical direction and is configured to support the associated vehicle differential at a position below the body, the differential support element collar comprising:
   a central portion formed of metal; and
   a peripheral portion formed of a composite material, the peripheral portion surrounding at least a portion of a peripheral surface of the central portion, and the peripheral portion being joined to and integrated with the composite material of the body of the differential support member.

7. A vehicle suspension and differential mounting assembly, comprising:
   a base frame formed of metal and having a pair of lateral members transversely spaced from one another, each of the lateral members having a bracket provided thereon;
   a vehicle differential;
   a differential support member secured to the base frame, the differential support member having a body formed of a composite material and secured at each end to one of the base frame lateral member brackets, and a differential support element securing the vehicle differential to the differential support member body;
   a pair of brackets each provided on a transverse inner portion of one of the lateral members which faces the other lateral member, each bracket secured to and supporting one end of the differential support member body, wherein the bracket provided on one lateral member is aligned in a lateral direction with the bracket provided on the other lateral member; and
   a pair of suspension system mounting members which are each integrated with one of the brackets via a connecting member and provided on a transverse outer portion of one of the lateral members with the connecting member extending transversely across the lateral member, each suspension system mounting member being laterally aligned with the bracket with which it is integrated.

8. The vehicle suspension and differential mounting assembly according to claim 7, wherein the differential support element comprises at least one annular collar which extends through the body in a vertical direction and is configured to support the vehicle differential at a position below the body, the differential support element collar comprising:
   a central portion formed of metal; and
   a peripheral portion formed of a composite material, the peripheral portion surrounding at least a portion of a peripheral surface of the central portion, and the peripheral portion being joined to and integrated with the composite material of the body of the differential support member.

* * * * *